UNITED STATES PATENT OFFICE.

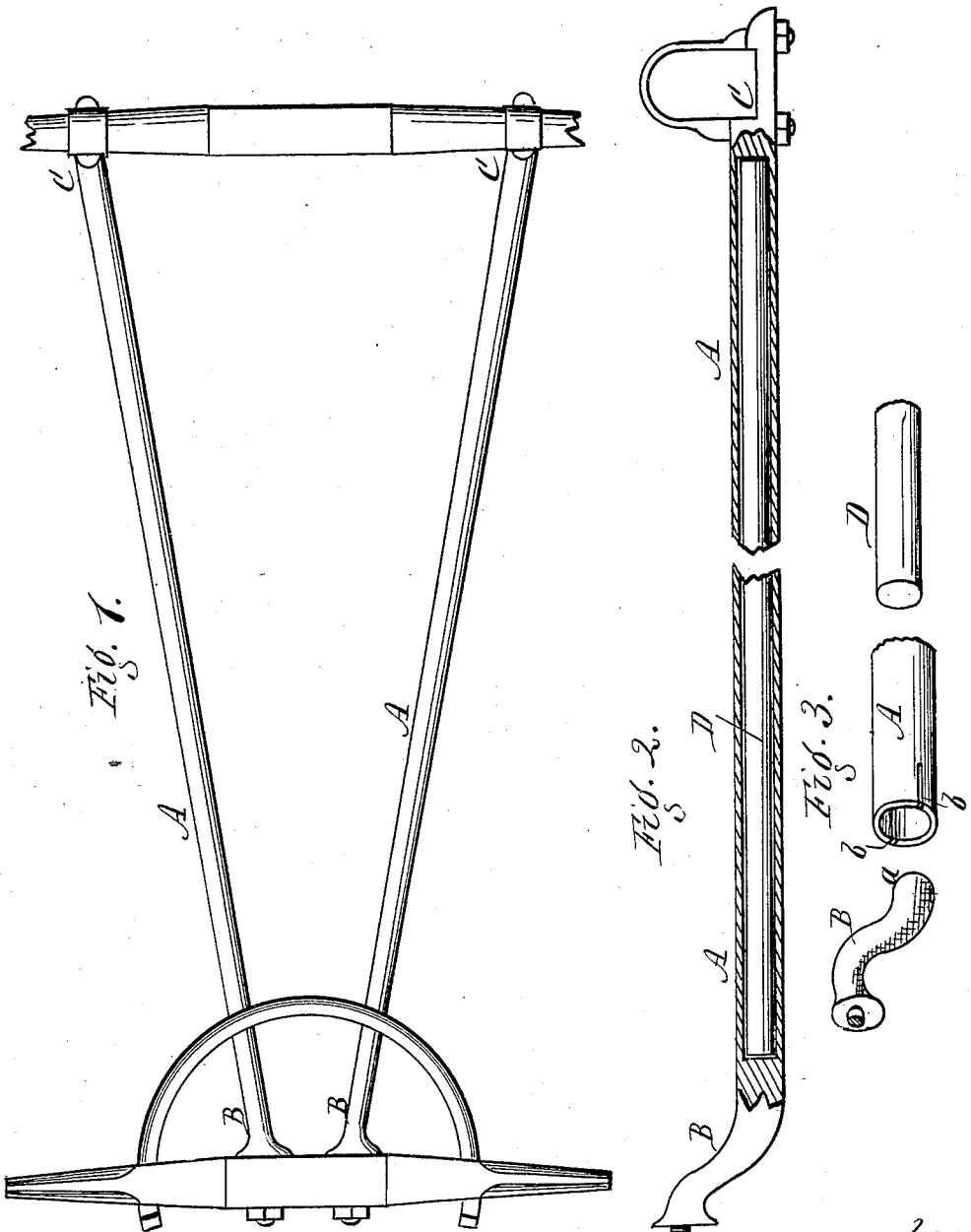

CHARLES K. ROBINSON, OF LYONS, NEW YORK, ASSIGNOR OF ONE-HALF TO NELLIE L. HOTCHKISS, OF SAME PLACE.

VEHICLE-REACH.

SPECIFICATION forming part of Letters Patent No. 257,073, dated April 25, 1882.

Application filed August 12, 1881. (No model.)

*To all whom it may concern:*

Be it known that I, CHARLES K. ROBINSON, of Lyons, Wayne county, New York, have invented a certain new and useful Improvement in Vehicle-Reaches; and I do hereby declare that the following is a full, clear, and exact description of the same, reference being had to the accompanying drawings, in which—

Figure 1 is a plan of a double reach attached to the axle and head-block of a vehicle, and showing my improvement. Fig. 2 is a longitudinal sectional view of the reach. Fig. 3 is a perspective view of one end, showing the parts separated.

My improvement relates to tubular metallic reaches.

Ordinary reaches are made of wood and ironed, and are objectionable for many reasons, the principal ones of which are that they are expensive, difficult to fit, are constantly rattling, and are weak.

My invention consists of a tubular metallic reach having solid bearing ends welded thereto, by which the parts are readily attached to the head-block and axle, and also in such a reach having a filling of wood resting in the tube, as hereinafter more fully described.

In the drawings, A represents the reach, which is made of a piece of metallic tube—such as gas-tube—of proper length. At the ends this tube has solid metallic bearing ends B C, provided with bolts and clips for attaching to the wood-work. These ends are first forged or formed, having an end, *a*, which fits loosely but closely into the end of the tube. The end of the tube itself is slitted or split on one or more sides, as shown at *b*. The end of the tube is slightly spread, the end of the bearing is inserted therein, and the whole is welded together and drawn out into a smooth and solid body, as shown in Fig. 2.

By the means above described a tubular metallic reach can be formed which is solid or integral from end to end, provided with solid ends that can be attached to the wood-work in the same manner that wooden reaches are, and which is light, strong, substantial, and which presents a much better appearance than the ordinary wood reach. It obviates the necessity of ironing, as in wooden reaches, avoids the rattling and the loosening of parts, and produces much better work.

The reach may be used double, as shown in Fig. 1, or single, as in ordinary reaches, and it may be made with curved ends, as shown, or in a straight length.

Before the ends B C are welded on I prefer to insert a filling, D, of wood into the tube, as shown in Fig. 2. It is preferably made to extend the whole length of the tube. This wood filling serves to fill the body of the tube, stiffen the parts, and has the effect of deadening vibrations and preventing noise.

Having thus described my invention, I claim—

1. A vehicle-reach consisting of a metallic tube having solid bearing ends welded thereto, the whole forming one integral body, as herein shown and described.

2. A vehicle-reach consisting of a metallic tube with solid bearing ends welded thereto and a wood filling resting in the tube, as herein shown and described.

In witness whereof I have hereunto signed my name in the presence of two subscribing witnesses.

CHARLES K. ROBINSON.

Witnesses:
JAMES E. KIRK,
M. A. VEEDER.